United States Patent
Yamasaki

(10) Patent No.: US 10,549,370 B2
(45) Date of Patent: Feb. 4, 2020

(54) ROTATION TABLE

(71) Applicant: FANUC Corporation, Yamanashi (JP)

(72) Inventor: Mizuho Yamasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 457 days.

(21) Appl. No.: 15/359,663

(22) Filed: Nov. 23, 2016

(65) Prior Publication Data

US 2017/0144240 A1    May 25, 2017

(30) Foreign Application Priority Data

Nov. 25, 2015    (JP) ................................ 2015-229985

(51) Int. Cl.
| | | |
|---|---|---|
| *B23H 11/00* | (2006.01) | |
| *B23H 1/00* | (2006.01) | |
| *B23Q 1/25* | (2006.01) | |
| *B23H 7/26* | (2006.01) | |

(52) U.S. Cl.
CPC ............. *B23H 11/003* (2013.01); *B23H 7/26* (2013.01)

(58) Field of Classification Search
CPC .... F16J 15/3268; B23H 11/00; B23H 11/003; B23H 1/00; B23Q 2220/004
See application file for complete search history.

(56) References Cited

U.S. PATENT DOCUMENTS

| | | | |
|---|---|---|---|
| 3,409,535 A | | 11/1968 | Ross et al. |
| 3,667,305 A | * | 6/1972 | Rasoira .................. B23Q 1/262 409/900.2 |
| 3,772,961 A | * | 11/1973 | Siebert ..................... B23Q 1/38 384/100 |
| 3,797,333 A | * | 3/1974 | Maier .................... B23Q 16/00 74/826 |
| 3,871,665 A | | 3/1975 | Burke et al. |
| 3,975,608 A | * | 8/1976 | Ullmann .................. B23H 7/28 219/69.17 |
| 4,021,049 A | | 5/1977 | Phelps et al. |
| 4,076,339 A | * | 2/1978 | Schrolucke .............. B23Q 1/38 384/112 |

(Continued)

FOREIGN PATENT DOCUMENTS

| | | |
|---|---|---|
| CN | 101158437 A | 4/2008 |
| CN | 101966615 A | 2/2011 |

(Continued)

OTHER PUBLICATIONS

Extended European Search Report in EP Application No. 16200402.2, dated Mar. 20, 2017.

(Continued)

*Primary Examiner* — Dana Ross
*Assistant Examiner* — Lawrence H Samuels
(74) *Attorney, Agent, or Firm* — Hauptman Ham, LLP

(57) ABSTRACT

A rotation table of the present invention includes a seal mechanism portion including a sealing material arranged between a casing and a face plate, a casing-side grooved portion for forming a casing-side seal mounting groove which is formed on an end of the casing and retains the sealing material, and a seal holding plate for holding the sealing material, wherein a portion having the casing-side grooved portion and the seal holding plate are configured to be separable.

8 Claims, 7 Drawing Sheets

(56) References Cited

U.S. PATENT DOCUMENTS

| | | | | |
|---|---|---|---|---|
| 4,196,908 A * | 4/1980 | Rose | B02C 13/1807 | 277/346 |
| 4,337,385 A * | 6/1982 | Maropis | B23Q 1/621 | 219/69.2 |
| 4,841,126 A * | 6/1989 | Graeber | B23H 7/02 | 219/69.17 |
| 4,881,829 A | 11/1989 | Koelsch | | |
| 5,133,538 A * | 7/1992 | Maeda | B23B 31/18 | 269/309 |
| 5,234,081 A * | 8/1993 | Watanabe | B23Q 1/287 | 188/366 |
| 7,530,293 B2 * | 5/2009 | Nitta | B23Q 1/265 | 74/813 R |
| 8,596,425 B2 * | 12/2013 | Yoshimoto | B23Q 16/107 | 188/72.4 |
| 9,975,193 B2 * | 5/2018 | Yamasaki | B23Q 11/0883 | |
| 10,029,339 B2 * | 7/2018 | Nishimura | B23Q 16/105 | |
| 10,052,704 B2 * | 8/2018 | Yamasaki | B23H 11/003 | |
| 10,099,305 B2 * | 10/2018 | Yamasaki | B23H 11/003 | |
| 2004/0256812 A1 | 12/2004 | Terazawa | | |
| 2008/0220922 A1 * | 9/2008 | Katsuma | B23Q 16/025 | 475/31 |
| 2010/0051846 A1 * | 3/2010 | Aoki | F16J 15/164 | 251/214 |
| 2015/0053651 A1 * | 2/2015 | Yamasaki | B23H 7/20 | 219/69.19 |
| 2015/0290734 A1 * | 10/2015 | Yamasaki | B23H 11/003 | 219/69.11 |
| 2016/0089739 A1 * | 3/2016 | Yamasaki | B23Q 11/0883 | 219/69.11 |
| 2016/0243660 A1 * | 8/2016 | Nishimura | B23Q 16/105 | |
| 2016/0256969 A1 * | 9/2016 | Ishizaki | B23Q 1/38 | |
| 2017/0239770 A1 * | 8/2017 | Tachiki | B23Q 16/105 | |
| 2019/0135475 A1 * | 5/2019 | Triebel | B65C 9/04 | |

FOREIGN PATENT DOCUMENTS

| | | | |
|---|---|---|---|
| EP | 0365105 | A2 | 4/1990 |
| JP | 2-92117 | U | 7/1990 |
| JP | 9-103931 | A | 4/1997 |
| JP | 2004-308730 | A | 11/2004 |
| JP | 2005118915 | A | 5/2005 |
| JP | 2008-272853 | A | 11/2008 |
| JP | 2008272853 | * | 11/2008 |
| JP | 2011104725 | A | 6/2011 |
| JP | 2015-42428 | A | 3/2015 |
| JP | 2015-48865 | A | 3/2015 |
| JP | 2015-199172 | A | 11/2015 |

OTHER PUBLICATIONS

Office Action in JP Application No. 2015-229985, dated Nov. 21, 2017, 6 pp.

Office Action in CN Application No. 201611048600.0, dated Feb. 3, 2019, 15pp.

* cited by examiner

ROTATION TABLE

RELATED APPLICATIONS

The present application claims priority to Japanese Patent Application Number 2015-229985, filed Nov. 25, 2015, the disclosure of which is hereby incorporated by reference herein in its entirety.

BACKGROUND OF THE INVENTION

1. Field of the Invention

The present invention relates to a rotary table for use in an electrical discharge machine.

2. Description of the Related Art

FIG. 11 is a cross-sectional view of a general rotation table for use in an electrical discharge machine, viewed from a horizontal direction of the rotary surface of a rotation table. As illustrated in FIG. 11, inside a casing 1 of a rotation table 24, a power portion 2 and a speed reducer 3 are arranged, and a bearing support portion 7 is juxtaposed thereto near the end of the casing 1. A bearing portion 4 is supported by the bearing support portion 7. An axis 5 and a face plate 6 are fixed on both sides of the bearing portion 4. The axis 5 and the face plate 6 are freely rotatable in synchronization with the rotation of the speed reducer 3. A seal mechanism portion 8 is arranged adjacent to the bearing support portion 7, and a sealing material 9 is accommodated in a seal mounting groove 83 in the seal mechanism portion 8. The sealing material 9 contacts the outer circumferential surface of the face plate 6 and prevents entry of working liquid into the casing 1 through a gap 11 between the seal mechanism portion 8 and the face plate 6.

As prior art pertaining to a rotary table including a sealing member as described above, for example, JP 2005-118915 A pertaining to a rotation table for use in electrical discharge machining discloses a sealing material mounted between a rotary axis body and a rotary table, and a mounting structure for a current collection device. Furthermore, JP 2011-104725 A pertaining to a rotary axis where the axis is sealed with a sealing material discloses a technique characterized in that high-pressure air is supplied to a sealing portion between a body and a rotary table, the high-pressure air from the sealing portion passes through a gap between the body and an air seal ring and flows to the outside of the rotary table, so that entry of foreign substances through the gap is prevented.

During machining with an electrical discharge machine, machining waste, called sludge, is generated and is suspended in a working liquid. When the working liquid containing sludge enters the gap 11 as indicated by arrow 18, the sludge is attached between the sealing material 9 and the face plate 6, leading to early wear of the sealing material 9. When the sealing material 9 is worn, the working liquid enters inside the casing 1, resulting in damage to the power portion 2 and the speed reducer 3. Thus, the sealing material 9 needs to be replaced.

However, in the case of the rotation table 24 illustrated in FIG. 11 and the rotation table indicated in JP 2005-118915 A and JP 2011-104725 A, the seal mechanism portion is formed in one piece. Therefore, there is a problem that, unless the face plate 6 is removed as illustrated in FIG. 12, the worn sealing material 9 cannot be replaced as illustrated in FIG. 13. Furthermore, there is a problem that, after the sealing material 9 is replaced, new one is mounted, and the face plate 6 is mounted, the rotational runout, the flatness of the face plate and the like need to be readjusted, requiring a number of man-hours in addition to the replacement operation for the sealing material.

SUMMARY OF THE INVENTION

It is an object of the present invention to provide a rotary table for use in an electrical discharge machine, which rotary table allows quick and easy replacement of a sealing material.

A rotation table according to the present invention includes a casing, a face plate which is pivotally supported on the casing, and a drive portion for rotating the face plate, wherein the rotation table includes a seal mechanism portion including a sealing material arranged between the casing and the face plate, a casing-side grooved portion for forming a casing-side seal mounting groove formed at an end of the casing for retaining the sealing material, and a seal holding portion for holding the sealing material, a portion having the casing-side grooved portion and the seal holding portion are configured to be separable.

In the rotation table, a side of the casing-side grooved portion facing the seal holding portion is at least partially notched.

The rotation table includes a holding-side grooved portion for forming a holding-side seal mounting groove for mounting the sealing material on the seal holding portion, wherein the sealing material is retained by the casing-side grooved portion and the holding-side grooved portion.

In the rotation table, at least one of edge portions of the sealing material which can be externally observed when the portion having the casing-side grooved portion and the seal holding portion are detached from one another has a projecting shape.

An electrical discharge machine according to the present invention uses any of the above described rotation table as a rotation table on which an object to be machined is mounted, and the electrical discharge machine includes a control device for controlling the rotation table and performing electrical discharge machining.

A seal mechanism according to the present invention is a seal mechanism for use in a rotation table including a casing, a face plate pivotally supported on the casing, and a drive portion for rotating the face plate, and the seal mechanism includes: a sealing material arranged between the casing and the face plate; a casing-side grooved portion for forming a casing-side seal mounting groove for retaining the sealing material, the casing-side seal mounting groove being formed on an end of the casing; and a seal holding portion for holding the sealing material, wherein a portion having the casing-side grooved portion and the seal holding portion are configured to be separable.

The rotary table for use in an electrical discharge machine according to the present invention allows quick and easy replacement of a sealing material and enables a reduction in number of man-hours for the replacement operation for the sealing material as compared to a rotary table of the prior art.

BRIEF DESCRIPTION OF THE DRAWINGS

The aforementioned and other objects and features of the present invention will be apparent from the following descriptions of examples with reference to the accompanying drawings, in which.

DETAILED DESCRIPTION OF THE PREFERRED EMBODIMENTS

Figure 1:
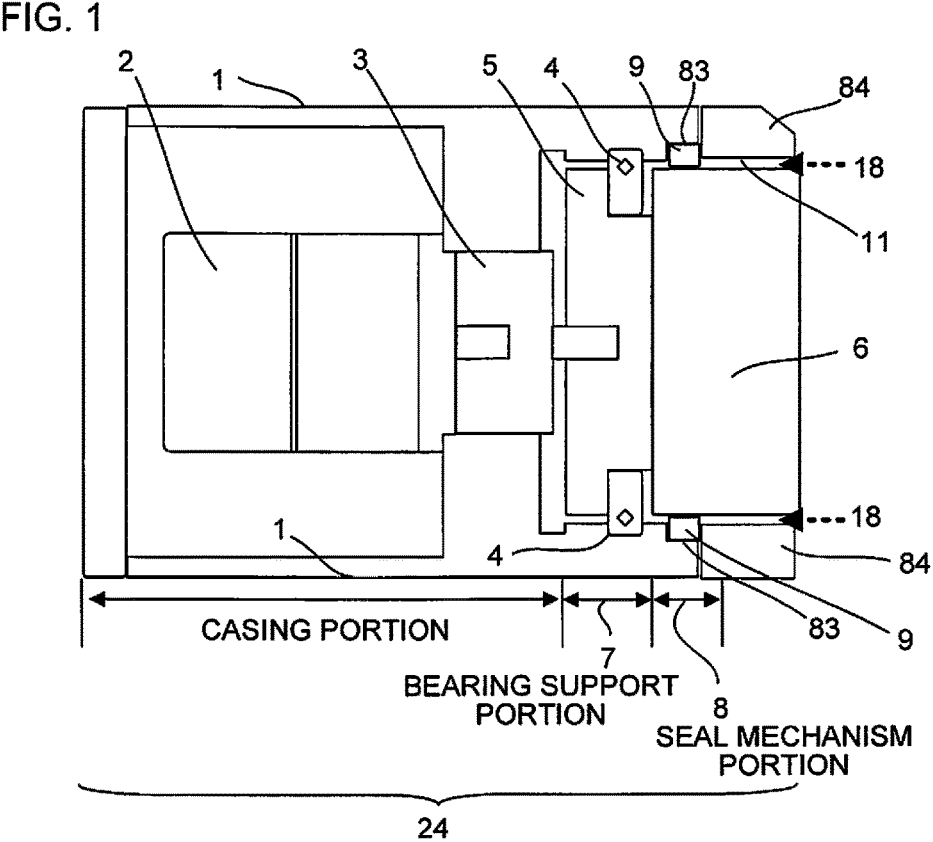
FIG. 1 is a cross-sectional view of a rotation table according to a first embodiment of the present invention.

In the following, embodiments of the present invention will be described in conjunction with the drawings. Features which are like or similar to those of the prior art are described by being designated with like reference numerals.

FIG. 1 is a cross-sectional view of a rotation table according to a first embodiment of the present invention, viewed from a horizontal direction of the rotary surface of a face plate. Similar to the rotation table 24 of the prior art, the rotation table 24 of the present embodiment includes a power portion 2 and a speed reducer 3 within a casing 1, and a bearing support portion 7 is juxtaposed to the power portion 2 and the speed reducer 3 near an end of the casing 1. Furthermore, a bearing portion 4 is supported by a bearing support portion 7. An axis 5 and a face plate 6 are fixed on both sides of the bearing portion 4. The axis 5 and the face plate 6 are freely rotatable in synchronization with rotation of the speed reducer 3. A seal mechanism portion 8 is arranged adjacent to the bearing support portion 7, and a sealing material 9 is accommodated between a seal holding plate 84 and a seal mounting groove 83 formed on an inner circumferential portion at the end of the casing 1. The casing 1 and the seal holding plate 84 are configured to be separable. The seal holding plate 84 may be mounted on the end of the casing 1 by a screw or the like or may be mounted by arranging an assembly mechanism which is fitted to both the end of the casing 1 and the seal holding plate 84.

Figure 2:
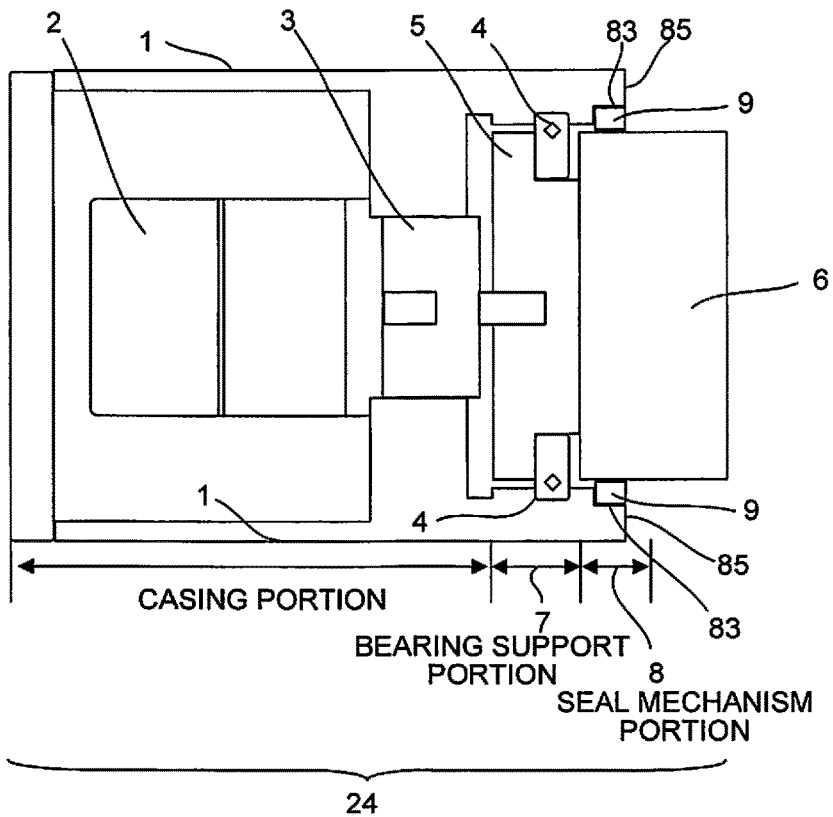
FIG. 2 is a view illustrating a state in which a seal holding plate of the rotation table of FIG. 1 is removed.
Figure 3:
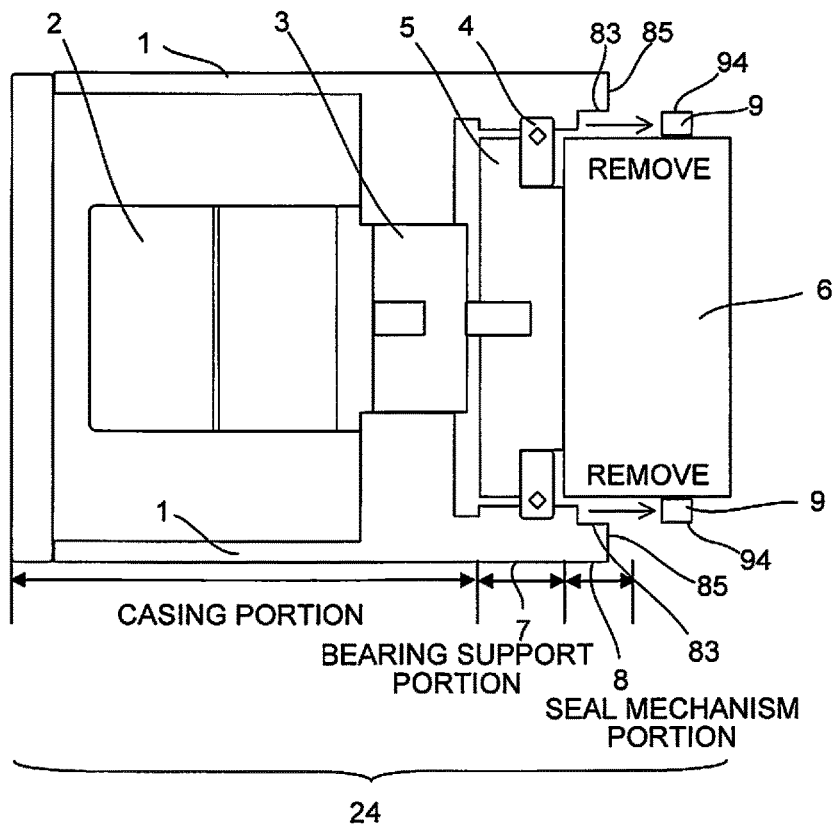
FIG. 3 is a view illustrating a state in which a sealing material of the rotation table of FIG. 2 is removed.

FIG. 2 illustrates a state in which the seal holding plate 84 is removed from the rotation table 24 illustrated in FIG. 1. Furthermore, FIG. 3 illustrates a state in which the sealing material 9 is removed in the state of FIG. 2.

As illustrated in FIG. 2, in the rotation table 24 of the present embodiment, when the seal holding plate 84 is removed, the sealing material 9 accommodated in the seal mounting groove 83 can be withdrawn without moving or removing the face plate 6 as an outer circumferential surface 94 of the sealing material 9 is gripped. Therefore, removal of the face plate 6, re-mounting the face plate 6 after the replacement operation for the sealing material 9, and the operations for readjusting the rotational runout, the flatness of the face plate and the like are not needed, enabling a reduction in number of man-hours for the replacement operation for the sealing material 9. Furthermore, the seal mounting groove 83 may be provided with a mechanism that pushes out the seal, for example, by means of rubber, a spring, or a wave washer.

Figure 4:
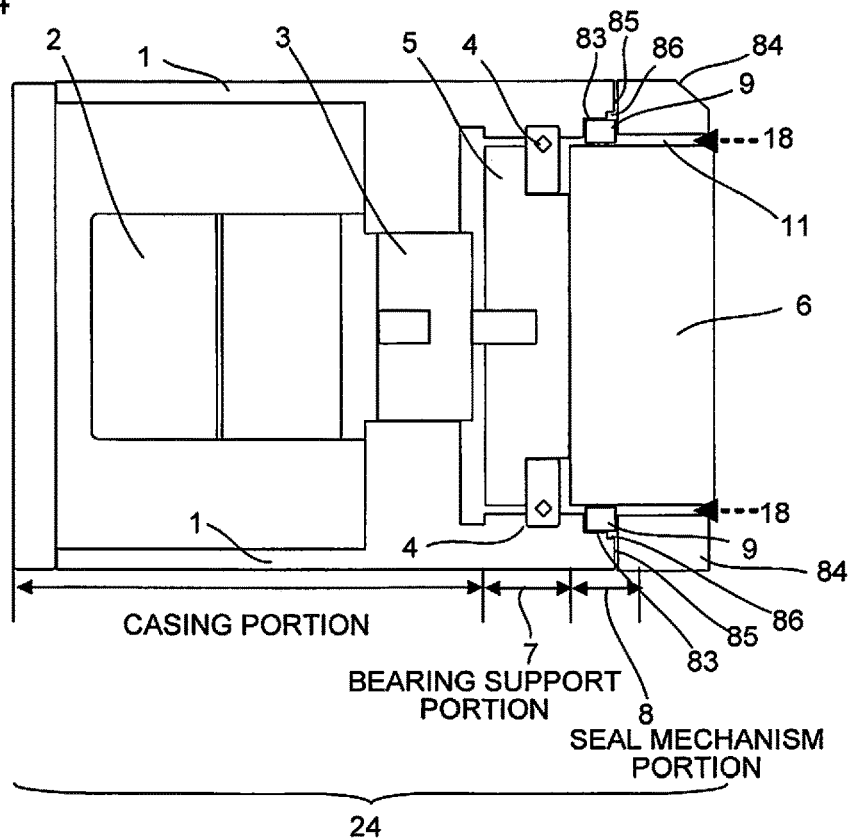
FIG. 4 is a cross-sectional view of a rotation table according to a second embodiment of the present invention.

FIG. 4 is a cross-sectional view of the rotation table according to the second embodiment of the present invention, viewed from a horizontal direction of the rotary surface of a face plate. The rotation table 24 of the first embodiment is structured such that a front surface 85 of the casing 1 and a side surface 92 of the sealing material 9 at the seal mechanism portion 8 are coplanar (in a flat state without a step between the two faces). However, the rotation table 24 of the present embodiment is structured such that the seal mounting groove 83 is provided with a notch 86.

Figure 5:
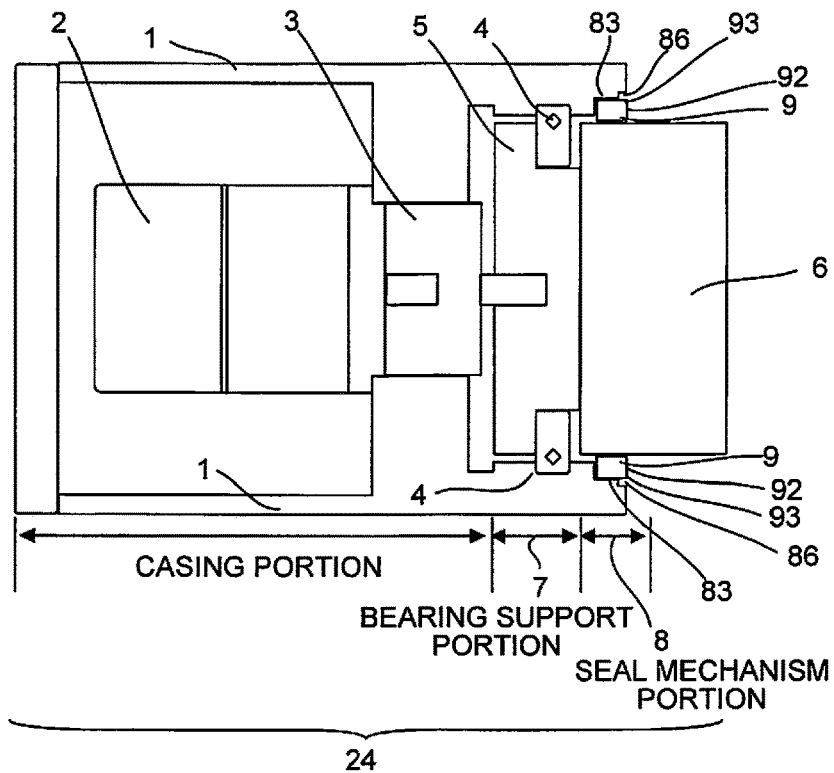
FIG. 5 is a view illustrating a state in which a seal holding plate of the rotation table of FIG. 4 is removed.
Figure 6:
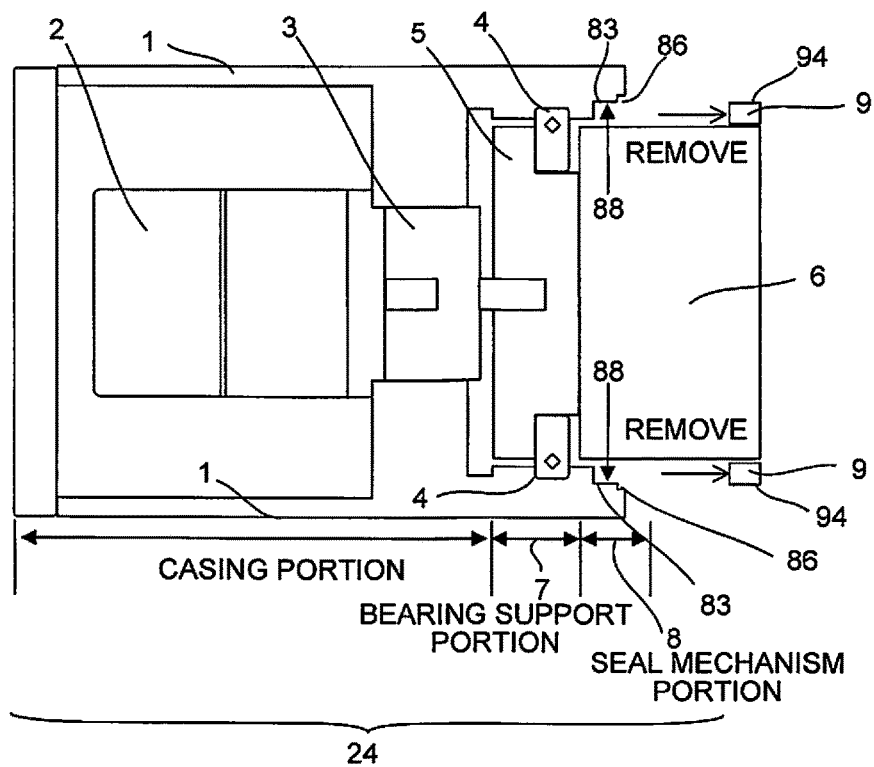
FIG. 6 is a view illustrating a state in which a sealing material of the rotation table of FIG. 5 is removed.

FIG. 5 illustrates a state in which the seal holding plate 84 is removed from the rotation table 24 illustrated in FIG. 4. Furthermore, FIG. 6 illustrates a state in which the sealing material 9 is removed in the state of FIG. 5.

As illustrated in FIG. 5, the rotation table 24 of the present embodiment is configured such that, when the seal holding plate 84 is removed, an edge portion 93 of the outer circumferential surface 94 of the sealing material 9 is exposed to the notch 86 formed on the casing 1. Therefore, the edge portion 93 of the sealing material 9 can be firmly grasped with a tool or the like. Thus, the sealing material 9 can more easily be replaced as compared to the first embodiment. Furthermore, without even a proper tool or the like, a pointed object, e.g., a needle, can be caught only on the edge portion 93 without contacting the inner circumferential surface of the seal mounting groove 83. Therefore, an inner circumferential surface 88 of the seal mounting groove 83 illustrated in FIG. 6 is prevented from being damaged by mistake. Incidentally, the notch 86 on the seal mounting groove 83 may be formed entirely or partially on the circumference.

Figure 7:
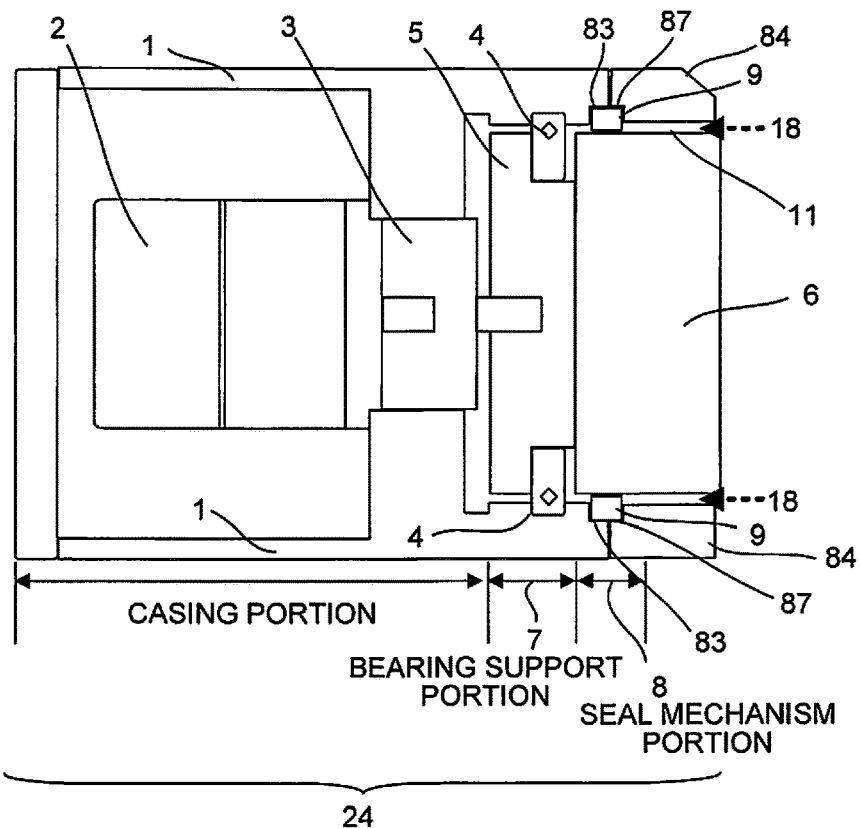
FIG. 7 is a cross-sectional view of a rotation table according to a third embodiment of the present invention.
Figure 8:
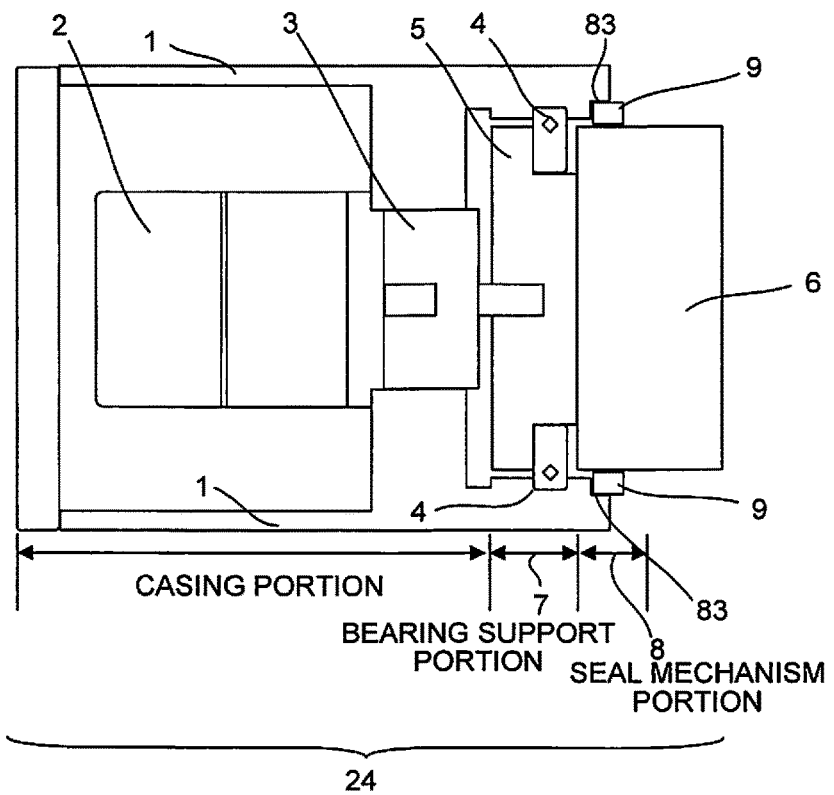
FIG. 8 is a view illustrating a state in which a seal holding plate of the rotation table of FIG. 7 is removed.

FIG. 7 is a cross-sectional view of a rotation table according to a third embodiment of the present invention, viewed from a horizontal direction of the rotary surface of a face plate. In the rotation table 24 of the present embodiment, the depth of the seal mounting groove 83 is smaller than the width of the sealing material 9. The sealing material 9 projecting beyond the seal mounting groove 83 is accommodated in a seal mounting groove 87 formed on the seal holding plate 84. With such a structure, the sealing material 9 can be retained and, as illustrated in FIG. 8, when the seal holding plate 84 is removed, the edge portion 93 of the sealing material 9 can easily be confirmed from the outside. Therefore, similar to the rotation tables 24 according to the first and second embodiments, the sealing material 9 can be removed easily.

Figure 9:
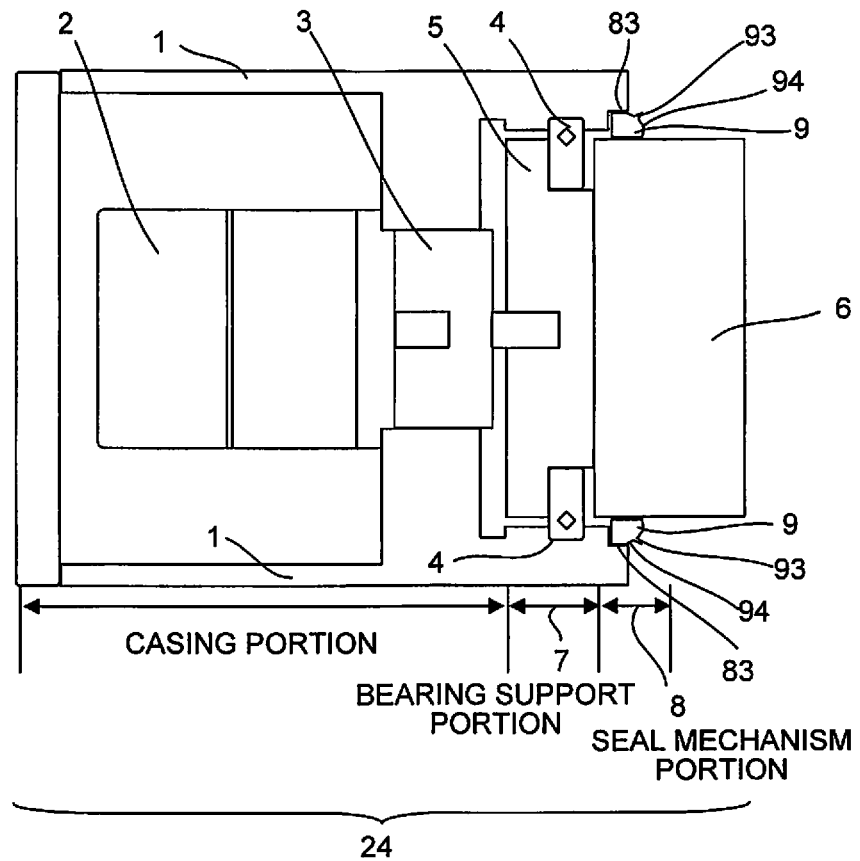
FIG. 9 is a cross-sectional view of a rotation table according to another embodiment of the present invention.

The edge portion 93 of the outer circumferential surface 94 of the sealing material 9 is not limited to a square shape, but may be preliminarily shaped such that the edge portion 93 can be grasped or caught with a tool as illustrated in FIG. 9.

Figure 10:
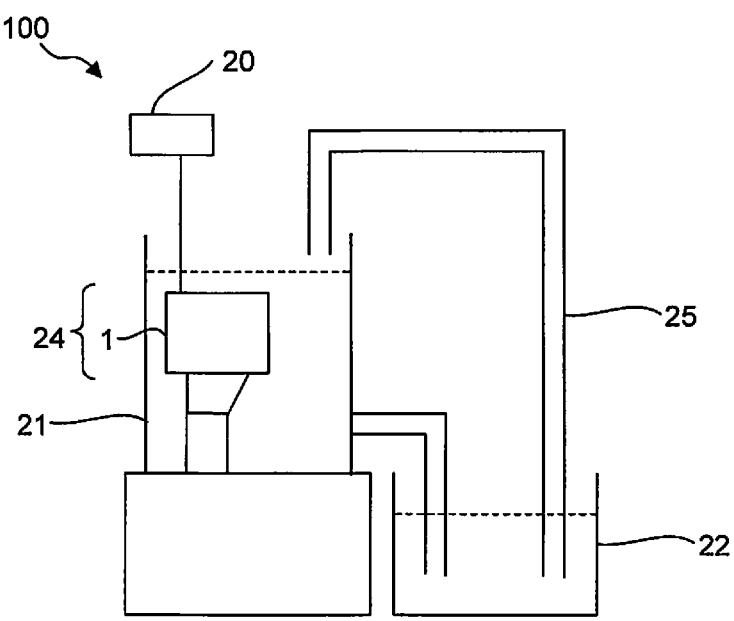
FIG. 10 is a schematic configurational view of an electrical discharge machine using a rotation table of the present invention.
Figure 11:
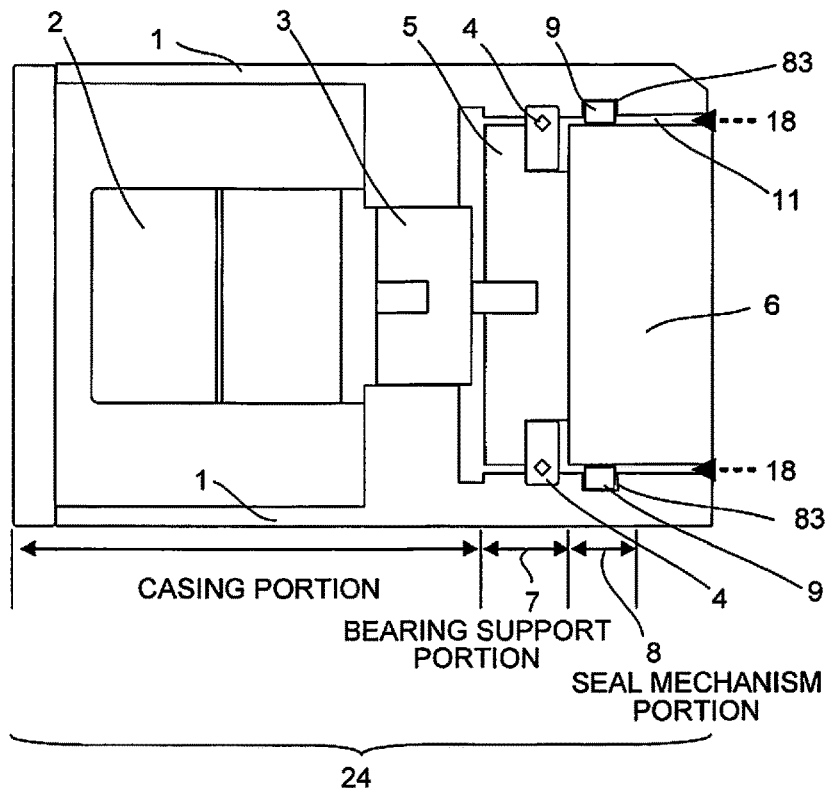
FIG. 11 is a cross-sectional view of a rotation table according to prior art.
Figure 12:
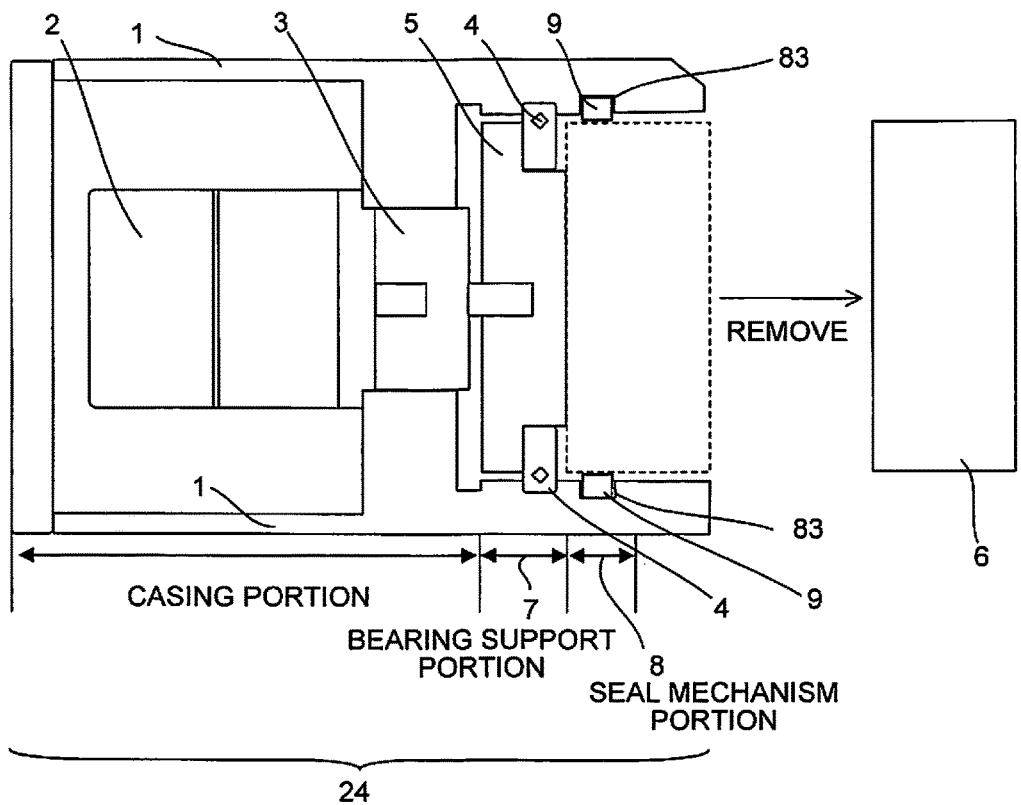
FIG. 12 is a view illustrating a state in which a face plate of the rotation table of FIG. 11 is removed.
Figure 13:
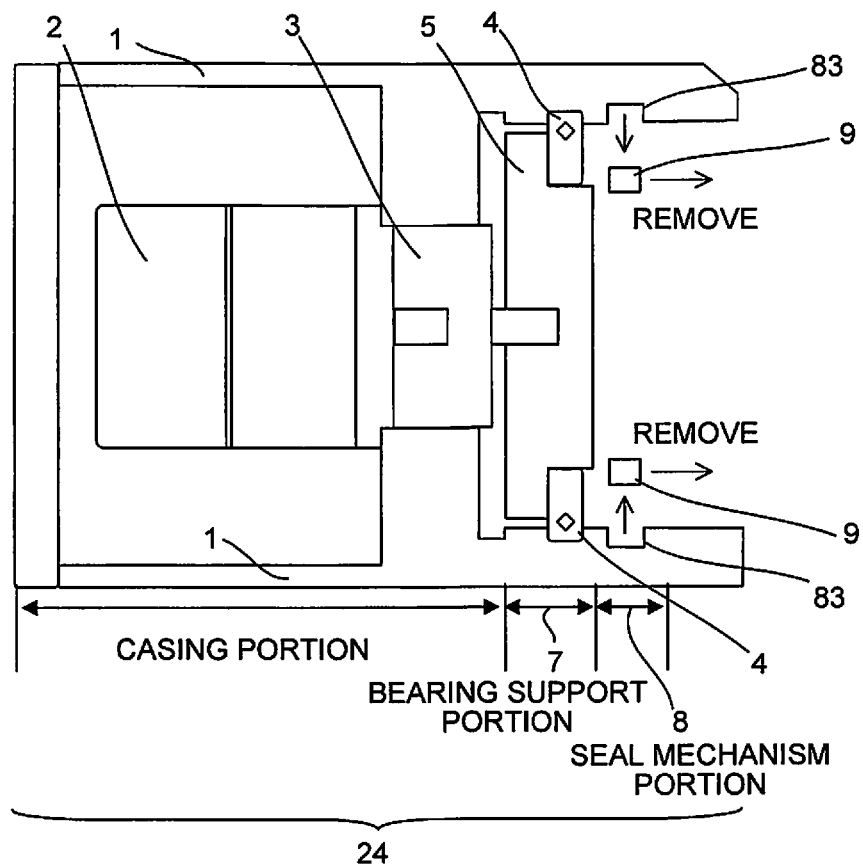
FIG. 13 is a view illustrating a state in which a sealing material of the rotation table of FIG. 12 is removed.

FIG. 10 is a schematic configurational view of an electrical discharge machine including the rotation table 24 of the present invention. The rotation table 24 for use in an electrical discharge machine 100 is arranged on a worktable in a working tank 21 which is filled with working liquid supplied from a working liquid supply unit 25 with a face plate 6 facing vertically (upward) or horizontally (laterally), and is used as an object to be machined is fixed to the face plate 6.

In the electrical discharge machine 100, electrical discharge machining is carried out under control of a control device 20. During electrical discharge machining, the operations of the power portion 2 and the speed reducer 3 of the rotation table 24 where a workpiece is placed are also controlled by a command from the control device 20. A working liquid containing sludge (fine metal powder) or the like generated during machining is discharged to a wastewater tank 22. The working liquid is cleaned by a filter or the like and is supplied to the working tank 21 by the working liquid supply unit 25. The rotation table 24 of the present invention is capable of preventing entry of sludge or the like into the casing 1 by means of the seal mechanism portion 8 and enables easy replacement of the sealing material 9 as the seal holding plate 84 is removed.

Heretofore, the embodiments of the present invention are described. However, the present invention is not limited to examples of the aforementioned embodiments only, but may be carried out in various aspects by adding an appropriate change.

For example, the material of the sealing material 9 is not limited to an elastic rubbery O-ring or oil seal, but in some cases may be a plastic seal.

The invention claimed is:

1. A rotation table, comprising:
   a casing;
   a face plate pivotally supported on the casing;
   a drive portion for rotating the face plate; and
   a seal mechanism portion including:
      a sealing material arranged between the casing and the face plate;
      a casing-side grooved portion for forming a casing-side seal mounting groove for retaining the sealing material, the casing-side seal mounting groove being formed on an end of the casing; and
      a seal holding portion for holding a side of the sealing material with the casing-side grooved portion,
   wherein a portion having the casing-side grooved portion and the seal holding portion are configured to be separable without moving or removing the face plate.

2. The rotation table according to claim 1, wherein a side of the casing-side grooved portion facing the seal holding portion is at least partially notched.

3. The rotation table according to claim 1, comprising a holding-side grooved portion for forming a holding-side seal mounting groove for mounting the sealing material on the seal holding portion,
   wherein the sealing material is retained by the casing-side grooved portion and the holding-side grooved portion.

4. The rotation table according to claim 1, wherein at least one of edge portions of the sealing material which is externally observable when the portion having the casing-side grooved portion and the seal holding portion are detached from one another has a projecting shape.

5. An electrical discharge machine, comprising:
   a rotation table on which an object to be machined is mounted; and
   a control device for controlling the rotation table and performing electrical discharge machining,
   wherein the rotation table comprises:
      a casing;
      a face plate pivotally supported on the casing;
      a drive portion for rotating the face plate; and
      a seal mechanism portion including:
         a sealing material arranged between the casing and the face plate;
         a casing-side grooved portion for forming a casing-side seal mounting groove for retaining the sealing material, the casing-side seal mounting groove being formed on an end of the casing; and
         a seal holding portion for holding a side of the sealing material with the casing-side grooved portion,
   wherein a portion having the casing-side grooved portion and the seal holding portion are configured to be separable without moving or removing the face plate.

6. A seal mechanism for use in a rotation table including a casing, a face plate pivotally supported on the casing, and a drive portion for rotating the face plate, the seal mechanism comprising:
   a sealing material arranged between the casing and the face plate;
   a casing-side grooved portion for forming a casing-side seal mounting groove for retaining the sealing material, the casing-side seal mounting groove being formed on an end of the casing; and
   a seal holding portion for holding a side of the sealing material with the casing-side grooved portion,
   wherein a portion having the casing-side grooved portion and the seal holding portion are configured to be separable without moving or removing the face plate.

7. The rotation table according to claim 1, wherein
   a side of the casing-side grooved portion facing the seal holding portion is at least partially notched to expose an edge of the sealing material when the seal holding portion is removed.

8. The seal mechanism according to claim 6, wherein
   a side of the casing-side grooved portion facing the seal holding portion is at least partially notched to expose an edge of the sealing material when the seal holding portion is removed.

* * * * *